No. 733,767. PATENTED JULY 14, 1903.
C. C. TAYLOR.
TRAVELER'S RECLINING ATTACHMENT FOR DRESS SUIT CASES.
APPLICATION FILED NOV. 19, 1902.
NO MODEL. 2 SHEETS—SHEET 1.
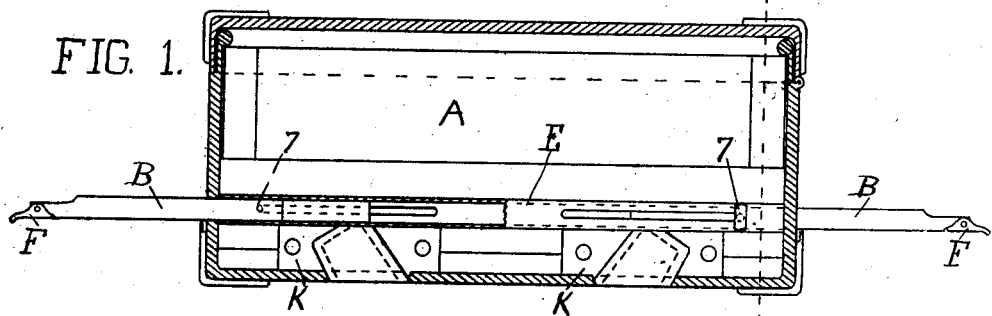
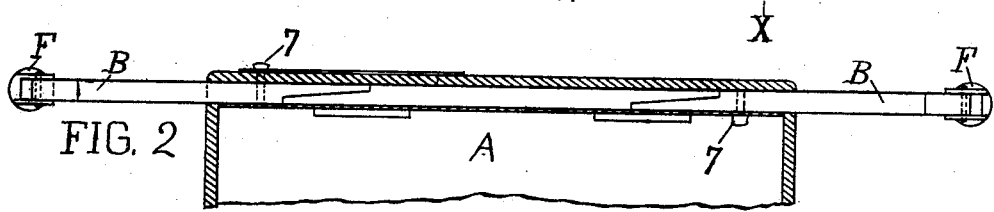
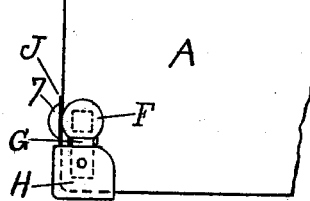
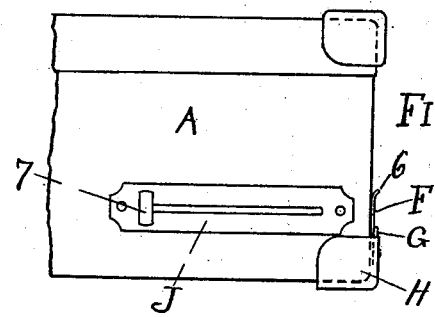
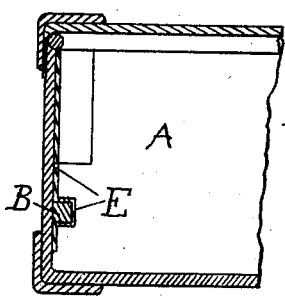
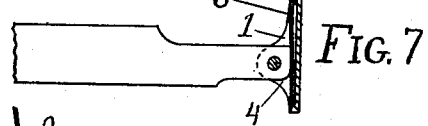
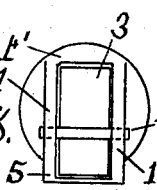

No. 733,767. PATENTED JULY 14, 1903.
C. C. TAYLOR.
TRAVELER'S RECLINING ATTACHMENT FOR DRESS SUIT CASES.
APPLICATION FILED NOV. 19, 1902.
NO MODEL. 2 SHEETS—SHEET 2.
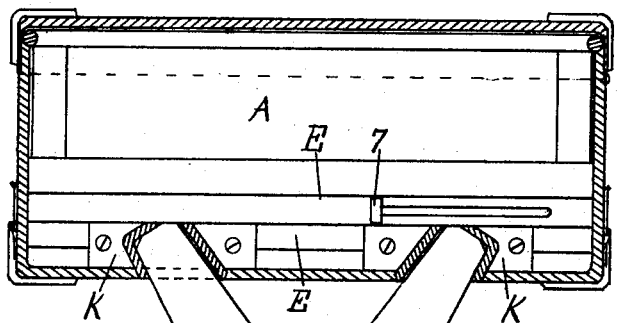
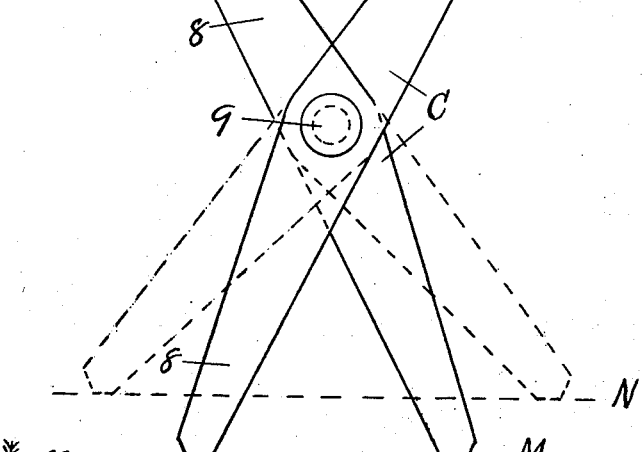
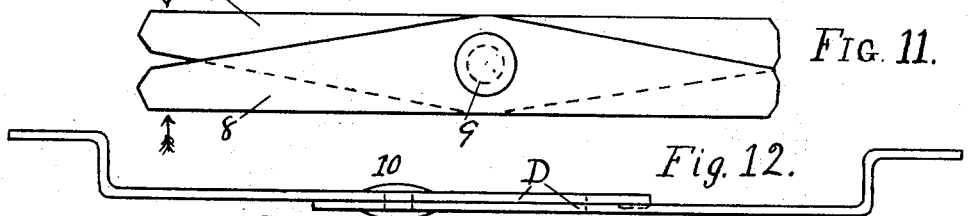
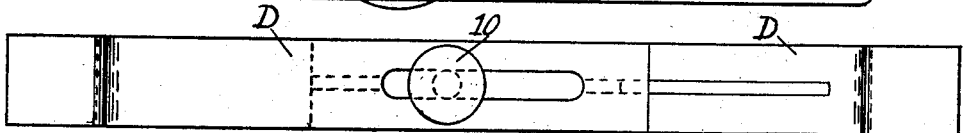
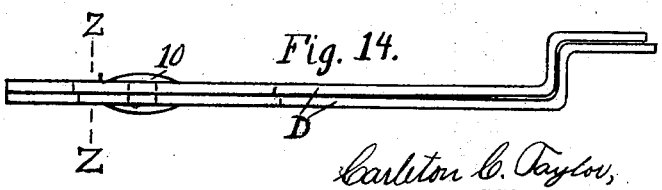

No. 733,767. Patented July 14, 1903.

UNITED STATES PATENT OFFICE.

CARLETON C. TAYLOR, OF DENVER, COLORADO.

TRAVELER'S RECLINING ATTACHMENT FOR DRESS-SUIT CASES.

SPECIFICATION forming part of Letters Patent No. 733,767, dated July 14, 1903.

Application filed November 19, 1902. Serial No. 132,030. (No model.)

*To all whom it may concern:*

Be it known that I, CARLETON C. TAYLOR, a citizen of the United States, residing at Denver, in the county of Arapahoe and State of Colorado, have invented a new and useful Traveler's Reclining Attachment for Dress-Suit Cases, of which the following is a specification, reference being had to the accompanying drawings.

This invention relates to a traveler's reclining attachment for dress-suit cases; and the principal objects of the same are, first, to provide a dress-suit case, valise, or other receptacle necessarily carried to inclose wearing-apparel with an attachment adapted to sustain the same in a horizontal position at a suitable height to answer for a support or bridge between car-seats and upon which the traveler may recline and sleep; second, to provide a separate device adapted to support the suit-case in position for a reclining-rest at night, the said means of support being capable of being folded up and placed inside of the suit-case or valise with which it is used. These objects are achieved by means of the construction and mechanism illustrated in the accompanying drawings, in which—

Figure 1 is a transverse sectional elevation through a dress-suit case near its end and shows the slides and sockets of this invention. A portion of the left end of the slideway is broken away in this figure to better show the slide and slot beyond. Fig. 2 is a plan view of the end of suit-case and is shown in section at the top surface of the slides of Fig. 1. Fig. 3 is an exterior side elevation of a corner of the suit-case and as seen from the left in Fig. 2 after the slide has been pushed into its position when not in use. Fig. 4 is an end elevation of the same corner as seen in Fig. 3 and as seen from the left therein. Fig. 5 is a partial longitudinal sectional elevation at line X X of Fig. 1 and as seen from the left therein and shows the form of slideway. Fig. 6 is a side elevation of the outer end of one of the slides with its attached tip-up piece at the end broken away to the line of side surface of the slide. Fig. 7 is a side elevation similar to Fig. 6, but with the tip-up piece in its vertical position as when the slide is shoved in and out of use. Fig. 8 is an interior view of the tip-up piece with its pin and spring as seen from the left in Fig. 7, the slide having been removed. Fig. 9 is an edge view of the spring of the tip-up piece and as seen from the left in Fig. 8. Fig. 10 is a transverse sectional elevation of the suit-case similar to Fig. 1, but with the slides shoved in and a substitute support provided in the form of a pair of crossed pivoted bars which are shown as inserted in the bearing places or sockets provided for them beneath the slides, the said sockets being shown with their inner side plates broken away. Fig. 11 is a side view of the crossed-bar support when separated from the suit-case and folded ready to pack away within the same. Fig. 12 is a side elevation of another form of support for the suit-case. Fig. 13 is a plan view of the support shown in Fig. 12. Fig. 14 is a side elevation of the support shown in Figs. 11 and 12 when folded and ready to pack away in the suit-case. Fig. 15 is a transverse section of the support at line Z Z of Fig. 14 and as seen from the right therein.

Similar characters designate like parts in the several views.

The term "dress-suit case" will for convenience be herein shortened to "suit-case" and is here used to represent any form of traveler's satchel or valise which would be suitable to form a place for reclining upon when placed between adjacent car-seats and sustained with its top surface approximately on level with the top of seat-cushions. The suit-case will be designated in a general way by A, and three convenient ways of supporting the same are shown, one form being by means of the slides B, which may be drawn out and project at the sides from the four corners of the case at a distance of about four inches from its top surface and adapted to rest on the seat-supporting frame of the car, the seat itself being raised slightly to allow the ends of the slides to enter between the seat and the seat-support. A second form of support which may be used as a substitute for the slides is a support reaching to the floor of the car and designated in a general way by C. This form of support is preferably formed of two similar bars of wood or metal, which are pivoted together at or near their center, so as to be in the form of an X when in use, and two of these supports are provided, one for each end of the suit-case. A third form of support consists of two bars D, of metal, which are pivotally secured together, preferably with a pivot, which slides in one or both bars, thus allowing the bars to be folded into practically half-length to pack away and to be extended more or less when straightened out, as in Figs. 12 and 13, that the same may extend from seat to seat in the car, though the same may be separated a greater or less distance apart. Two pairs of the bars D are provided, one pair under each end of the suit-case, which merely lays upon them, the bearing for them being the under surface of the suit-case near its ends. The bars D are similar and are preferably formed with their ends bent upward and then outward to make an offset that the central portion may be at the proper height to lay the suit-case upon and have its top surface approximately even with the top of seat-cushions when the end portions of the bars rest upon the seat-frame and beneath the seat proper. In the event of using a very thin suit-case or a board in its stead, the pair of jointed bars may be turned the other side up from the position shown in Fig. 12 to bring the central portion nearer the desired height. One of the bars D is preferably provided with a shallow groove, as shown in Figs. 13 and 15, and the mating bar is provided with raised portion O, which fits into the groove and tends to maintain the pair of bars in line with each other when extended or folded.

In the form of support comprising the slides B the same are preferably slidably mounted in a slideway made by folding a thin plate of metal E to form a square or rectangular opening just within the end of suit-case and extending entirely across the same. The front and rear sides are formed with a square hole in each in line with the slideway, and the slides B are preferably formed with cut-away portions, as shown in Fig. 2, at their inner ends, which admits of their overlapping each other when they are pushed in flush with the sides of the case. This overlapping feature is for the purpose of providing a longer bearing within the slideway when the slides B are fully extended, as in Figs. 1 and 2. In order to provide a greater bearing-surface of the slides B on the seat-supporting frame of car, also to provide slightly-hooked portions tending to prevent slipping off from the frame, and to provide a means of fastening the slides B in place when shoved in, the outer ends of the same are preferably provided with pivoted tip-up pieces F, as best shown in Figs. 6 and 7, the same comprising a plate portion and integral therewith side ears 1. It is pivoted astraddle of the end of the slide by the pin 2, and between the ears there is a depressed portion for the insertion of a bent ribbon-spring 3. The end portion of the slide B is preferably made of less depth than the body portion and is slightly rounded off at the corner 4 to admit of the tip-up piece being tipped through an angle of ninety degrees, with the spring 3 bearing upon the under side or the end of the slide and tending to retain the tip-up piece F in either of the positions shown, in which it may be left. The lower projecting end portion 5 of the tip-up piece is for the purpose of swinging out against the clip G, which is secured to the side of the suit-case and preferably under the corner-protecting piece of leather H, as shown in Figs. 3 and 4, the same being for the purpose of retaining the slides B in place after being shoved in out of the way. The opposite end of tip-up piece being bent outward, as at 6, allows the same to be engaged by the thumb or finger and tipped outward or extended and the slide to be drawn out thereby. In addition, if desired, each slide may be provided with a pin 7, the same to project through a slot in the slideway, where it may be taken hold of and the slide moved thereby. One slide B preferably has its pin 7 extend through a slot in the slideway, as shown in the right side of Fig. 1, and the mating slide has its pin 7 extend through a slot cut through the end of suit-case, as shown in the left side of Fig. 1 and in Fig. 4. A plate J is secured to the outside of the case surrounding the slot, as shown. By means of these last-named or outer pins 7 the slides of one side of the suit-case may be readily extended after the case is closed and notwithstanding the seat may be close to and just above the ends of the slides as they are started out. In Fig. 1 beneath the slideway two plates K are shown, and their central portions are formed with sockets which extend down through the bottom of suit-case, where they are open and adapted for the reception of the upper ends of the support C, the said sockets being slanted outward at the top to suit the X form of this support. These sockets are shown in section in Fig. 10 and may be said to be the "bearing-places" in the suit-case for the supports C. The socket-plates K are secured to the ends of the suit-case in any desired manner, as by means of the screws shown or by means of rivets. (Not shown.)

The support C comprises two similar bars 8, pivotally secured together at or near their center by means of a bolt or rivet 9, the same being intended to impinge the bars together sufficiently to tend to maintain them in any relative position in which they may be left, and this impingement is made use of to prevent the support C from dropping out of the sockets of the suit-case, as it is necessary for the top ends of C to be closed together somewhat in order to be withdrawn.

The height at which the suit-case as a reclining-rest may be supported may be varied in case of using the supports C by opening the same with a relative movement in the direction of the arrows in Fig. 11, when the position of the members of the support will be as indicated by the full lines, the line M representing the floor-line. In case of opening in the reverse direction from that indicated by the arrows and crossing the bars past one another from the position shown in Fig. 11 the position of the upper portion of the support C will be similar to the former position; but the position of the bottom portion will be as represented by the dotted lines, the height will be reduced accordingly, and the line N will now be the floor-line. This mode of vertical adjustment without any adjusting means except the selection of the direction of movement in opening the support C is essential, for the reason that it is absolutely simple, convenient, and adequate. It is quite possible to obtain a somewhat-similar form of adjustment in height of the suit-case when using the slides B as its supports by simply turning the suit-case over, when the greater distance from the slides to the top of case will have substituted for it the less distance from the slides to the bottom of case, which now becomes the top, and therefore the top surface used will be sustained at a lower level than before being reversed. The turning over of the supports D produces precisely the same result and leaves the upper surface of the suit-case or other article supported by them at a greater or less height above the seat-supporting frame upon which they rest, according to which side up they are placed.

When using the supports C with a suit-case, it may be used as a seat in other places than a car, and therefore be desirable for use of invalids, &c., in traveling.

I claim—

1. The combination, with two pairs of jointed, slidable bars, extending from the frame of one car-seat to the next, and a suit-case supported thereby.

2. The combination, with two pairs of jointed slidable bars bent near their ends to form an offset, and adapted to extend from the frame of one car-seat to the next, and a suit-case having a reclining surface supported thereby.

3. The combination with a traveler's suit-case or bag, of socket-grooves in the ends thereof and bars slidable in and out of said grooves to form extensible supports therefor from seat to seat of a car, substantially as described.

4. The combination with a traveler's suit-case or bag, of socket-grooves in the end thereof, bars slidable in and out of said grooves to form extensible supports therefor from seat to seat of a car, of tip-up pieces on the ends of said bars, and clips G upon said suit-case to engage said tip-up pieces and hold said bars in their sockets, substantially as described.

In testimony whereof I affix my signature hereto in presence of two subscribing witnesses.

CARLETON C. TAYLOR. [L. S.]

Witnesses:
J. W. COOLIDGE,
WALTER E. CRANE.